W. F. YOST.
OIL BURNER FOR BAKE OVENS.
APPLICATION FILED AUG. 19, 1918.

1,305,679.

Patented June 3, 1919.
2 SHEETS—SHEET 1.

Inventor
William F. Yost,
By Rummler & Rummler
Atty's

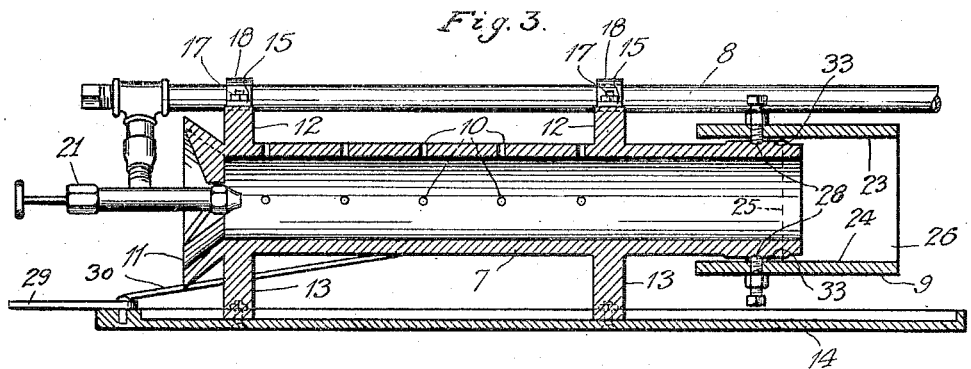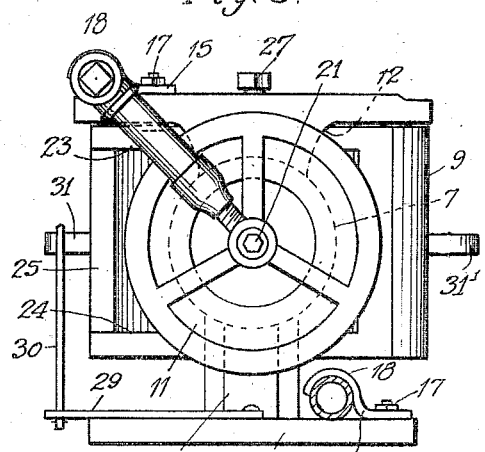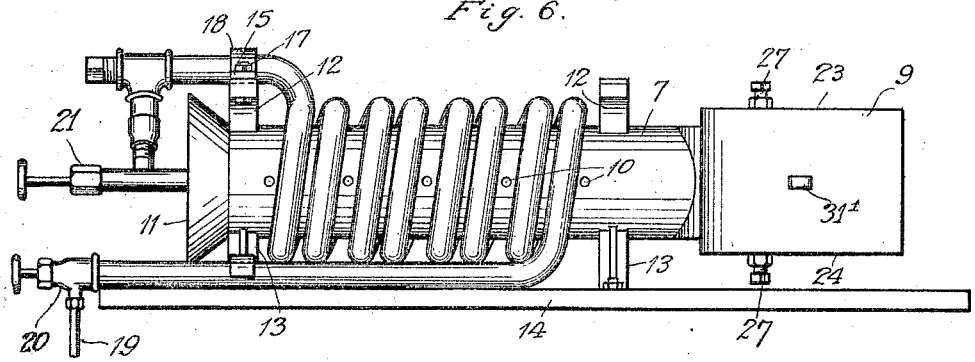

UNITED STATES PATENT OFFICE.

WILLIAM F. YOST, OF CHICAGO, ILLINOIS, ASSIGNOR OF ONE-HALF TO MORITZ H. KLAMT, OF CHICAGO, ILLINOIS.

OIL-BURNER FOR BAKE-OVENS.

1,305,679.     Specification of Letters Patent.     Patented June 3, 1919.

Application filed August 19, 1918. Serial No. 250,523.

*To all whom it may concern:*

Be it known that I, WILLIAM F. YOST, a citizen of the United States of America, and a resident of Chicago, county of Cook, and State of Illinois, have invented certain new and useful Improvements in Oil-Burners for Bake-Ovens, of which the following is a specification.

The main objects of this invention are to provide an improved form of oil burner for use in heating bake ovens and the like; to provide an improved construction and arrangement of means for deflecting the flame of the burner in various directions, so as to make it possible to heat the oven uniformly; to provide improved means for shifting said deflecting means; and to provide improved means for mounting the fuel supply pipe on said burner tube.

Illustrative embodiments of this invention are shown in the accompanying drawings, in which—

Fig. 3 is a longitudinal sectional view of the same.

Fig. 4 is a detail of one of the clips for detachably securing the supply pipe on the burner tube.

Fig. 5 is an end elevation of the burner.

Fig. 6 is a side elevation of the burner showing a modified arrangement of generator pipe.

Figure 1:
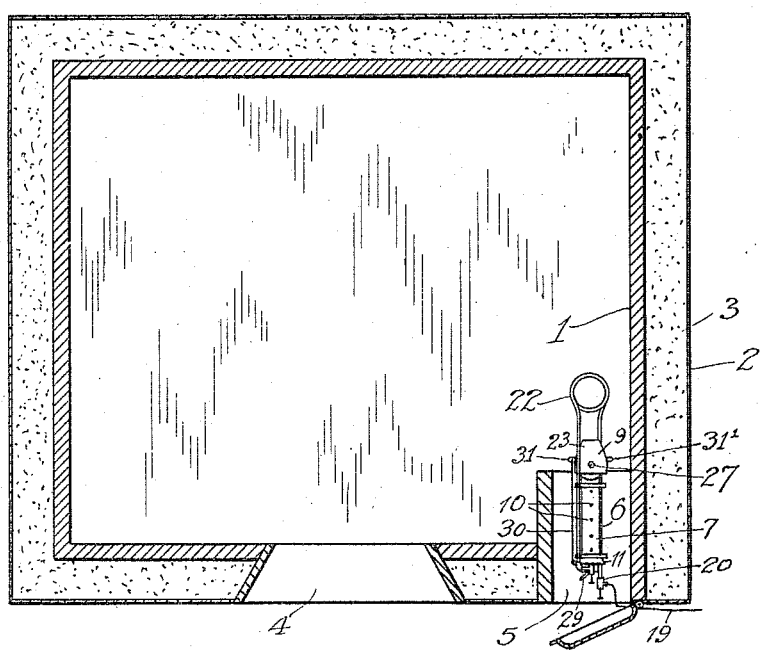
Figure 1 is a transverse sectional plan of a bake oven showing the improved oil burner arranged in the fire box thereof.
Figure 2:
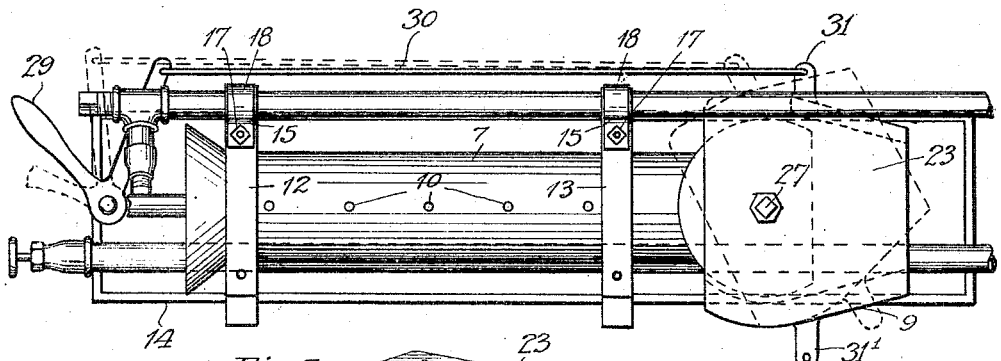
Fig. 2 is an enlarged plan of the oil burner itself.

This invention relates to oil burners used for heating that class of bake ovens in which the heat is first imparted to the interior of the oven until the temperature therein reaches a predetermined degree whereupon the heating is discontinued and the bread, pastry and other foods to be baked, are placed in the oven. Such foods as require but a short time to bake, are placed in the oven and baked first, and then the other foods which require a considerably longer time.

The oven itself is of a comparatively well known construction designed so as to retain the heat, imparted thereto, for a maximum length of time. It comprises an inner wall of fire brick 1 and an outer wall 2 formed of sheet metal and spaced away from the brick work. The space between the framework 1 and the wall 2 is filled with sand 3 which, because of its heat retaining qualities, prevents the heat from escaping very readily. The oven is provided at the front thereof with an opening through which the foods are placed in and removed from the oven. It is also equipped with a fire box 5 in one corner. In older constructions of this type, the fire box was arranged for burning solid fuel, such as wood or coal. Recently, however, oil burners have been employed for heating the oven, which burners have been placed in the fire box so that the flame is directed into the oven.

The usual forms of oil burner, heretofore on the market, have been objectionable because the flame of the burner could be directed in one direction only which obviously tended to heat the oven unevenly. The present invention obviates this by providing an improved arrangement of the burner tube, whereby the flame may be deflected in different directions, so as to make it possible to heat the oven uniformly.

The device herein shown is of the "Bunsen" type and comprises the usual form of burner tube 7 having a fuel supply pipe 8 supported thereon so as to serve as a generator, and provided with a member 9 pivotally mounted on the outer end of the tube 7 and adapted to be radially shifted with respect thereto, whereby the flame emitted from said tube may be deflected in different directions.

The burner tube 7 is a cylindrical member open at both ends and provided with a plurality of apertures 10 in the walls thereof, so as to permit the escape of heat from the inside of the tube. The rear end thereof is flared as at 11 where the fuel from the supply pipe enters the tube. A pair of supports or lugs 12 are formed on the upper side of the tube 7 adjacent the ends thereof for supporting the supply pipe 8, as more fully hereinafter described. The tube 7 is also provided with feet or lugs 13 on the under side thereof, diametrically opposite the supports 12, to which is detachably secured a tray 14.

The fuel supply pipe 8 is arranged on the burner tube so that by reason of its juxtaposition to the tube it serves as a generator wherein the oil is vaporized by the heat from burner. At one end the pipe 8 is connected with a pipe 19 leading to a source of supply (not shown), the flow of fuel from said source being controlled by a valve 20. The other end of the pipe 8 is provided with a needle valve 21 and extends partly into the tube 7 at the flared end thereof for directing the gas generated within said pipe into the tube 7 where it is mixed with air, entering through the flared end, and then ignited.

In the form shown in Fig. 1, the pipe 8 extends beyond the end of the burner tube and is there bent to form a coil 22, which is spaced a proper distance from the tube, so as to be adapted to be heated by the flame emitted from said tube and facilitate the vaporization of the oil. In the modification shown in Fig. 6, the pipe is arranged in spiral form around the outside of the burner tube.

The supply pipe is supported on the tube 7 by means of the supports or lugs 12, and detachably retained in place by means of clips 15. The clips 15 each comprise a strap flat at one end and arcuate shaped at the other. These are secured to the supports 12 by nuts and bolts 17 extending through holes 16 in the flat ends and through the corresponding lugs or supports. The arcuate shaped parts 18 embrace the pipe and clamp it in place.

Figure 7:
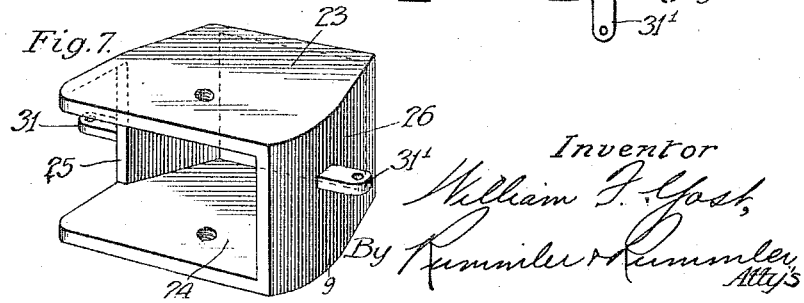
Fig. 7 is a perspective view of the deflecting member.

The deflecting member 9 for directing the flame emitted from the burner tube in different angles, comprises a housing substantially of the form shown in Fig. 7, having top and bottom 23 and 24 respectively and side walls 25 and 26. Threaded pins or set screws 27 are mounted on the top and bottom of said member and have their ends seated in recesses 28 in the bosses 33 formed on the burner tube at one end thereof. Said pins pivotally support the deflector on the burner tube so that it may be radially shiftable with respect thereto. The side wall 25 is recessed as shown in Fig. 7 to permit the housing to be shifted at an angle of substantially 90 degrees to the burner tube. This construction and arrangement of the deflector permits it to be shifted only toward one side of the burner. It is therefore, necessary to reverse the same when it it desired to direct the flame toward the other side of the burner. To effect this it is only necessary to loosen the pins 27 sufficiently to permit the housing to be removed from the tube and reversed, whereupon said pins are again adjusted to engage the seats 28 in the bosses 33.

The shifting of the deflecting member is accomplished by a bell crank lever 29 pivotally mounted on the forward end of the tray 14 and connected to said deflecting member by means of a link 30 attached at one end to the lever 29 and at the other end to a lug 31 formed on the side wall 25. The lever 29 is reversible on the tray 14 so that the link 30 may be arranged on the other side of the tube if it is so desired. For this purpose a lug 31' is formed on the side wall 26, which lug also permits the link 30 to be connected to the deflector if it should be reversed without reversing the lever 29.

The operation of this burner is substantially as follows: The valves 20 and 21 are opened so as to permit a small quantity of the liquid fuel to flow onto the tray 14 whereupon the valve 21 is closed and the fuel in the tray is ignited. The heat from the burning fuel in the tray will convert the liquid in the supply pipe 8 into vapor after which the needle valve 21 may be opened to permit the gas thus generated to escape into the tube 7 and mix with air. The gaseous mixture in the burner tube 7 may then be lighted whereupon the burner continues to operate in the well known manner.

The burner is placed in the oven as indicated in Fig. 1, and from time to time the deflector 9 is shifted so as to deflect the flame to different parts of the oven, with the result that the oven is uniformly heated as already explained.

Although but two embodiments of this invention have been herein shown and described, it will be understood that other modifications may be provided and that numerous details of the constructions shown may be altered or omitted without departing from the spirit of this invention as defined by the following claims.

I claim:

1. An oil burner of the class described, comprising a burner tube, a fuel and air supply located at one end for directing gaseous mixture into said tube, a deflector shiftably mounted on the other end of said tube and adapted to be radially shifted with respect thereto, and means for shifting said deflector whereby the flame emitted from said tube is deflected in different directions.

2. An oil burner of the class described, comprising a burner tube, a fuel and air supply located at one end for directing a gaseous mixture into said tube, a deflector mounted on the other end of said tube and adapted to be radially shifted with respect thereto, a lever pivotally mounted at said one end of said tube, and a link connecting said lever with said deflector whereby said lever is adapted to shift said deflector whereby the flame emitted from said tube is deflected in different directions.

3. An oil burner of the class described, comprising a burner tube, a fuel and air supply located at one end for directing a gaseous mixture into said tube, and a deflector pivotally mounted on the other end of said tube and protruding beyond the same, said deflector having one of the side walls thereof recessed so as to permit said deflector to be shifted at an angle to the longitudinal axis of said tube.

4. An oil burner of the class described, comprising a burner tube, a fuel and air supply located at one end for directing a gaseous mixture into said tube, a deflector pivotally mounted on the other end of said tube and protruding beyond the same, said deflector having one of the side walls thereof recessed so as to permit said deflector to be shifted at an angle to the longitudinal axis of said tube, and threaded pins carried by said deflector adapted to be adjusted to support said deflector on said tube in such a manner that the same may be located so as to swing in one direction or the other relative to the longitudinal axis of said tube.

Signed at Chicago this 12th day of August, 1918.

WILLIAM F. YOST.

Copies of this patent may be obtained for five cents each, by addressing the "Commissioner of Patents, Washington, D. C."